No. 895,302. PATENTED AUG. 4, 1908.
J. F. ROBERTSON.
VALVE.
APPLICATION FILED MAR. 3, 1906.

Witnesses:
E. R. Rodd.
Chas. S. Lipley.

Inventor:
John F. Robertson
by O. M. Clarke
his Attorney

UNITED STATES PATENT OFFICE.

JOHN F. ROBERTSON, OF BELLEVUE, PENNSYLVANIA.

VALVE.

No. 895,302.  Specification of Letters Patent.  Patented Aug. 4, 1908.

Application filed March 3, 1906. Serial No. 304,123.

*To all whom it may concern:*

Be it known that I, JOHN F. ROBERTSON, a citizen of the United States, residing at Bellevue, in the county of Allegheny and State of Pennsylvania, have invented certain new and useful Improvements in Valves, of which the following is a specification, reference being had therein to the accompanying drawing, forming part of the specification, in which—

Figure 1:
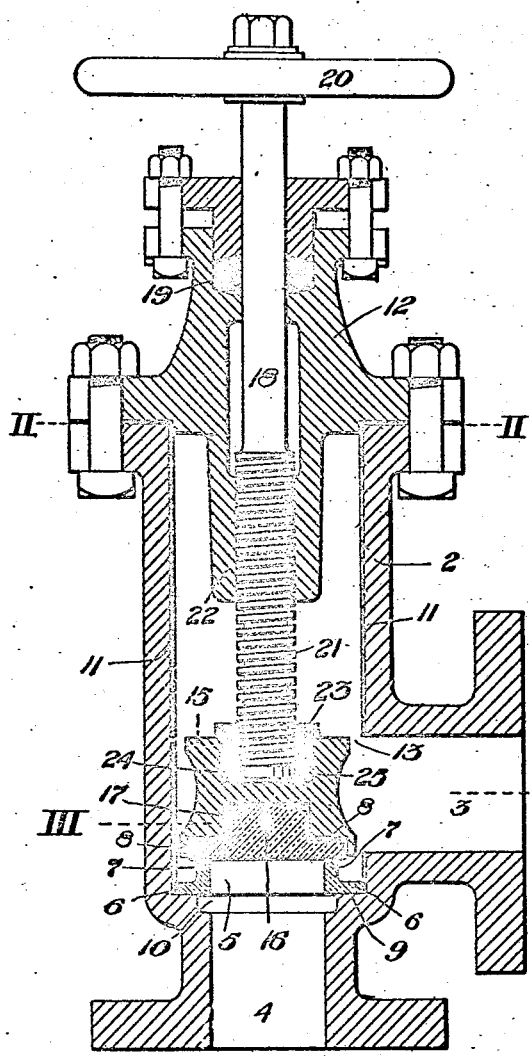
Figure 2:
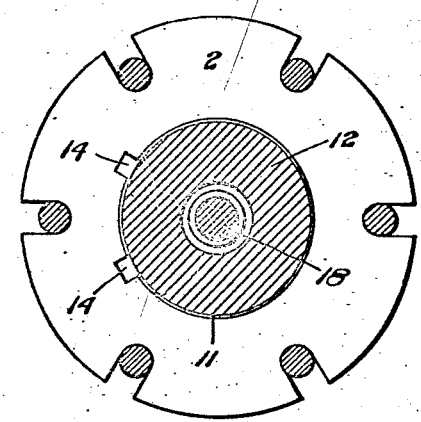
Figure 3:
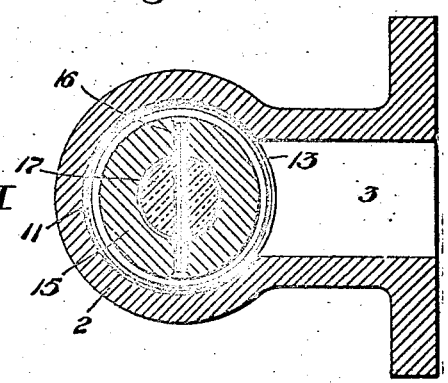

Figure 1. is a longitudinal vertical section through my improved valve. Fig. 2. is a cross section on the line II. II. of Fig. 1. Fig. 3. is a similar section on the line III. III.

My invention refers to improvements in valves and has for its objects to provide a valve in which the seat may be readily inserted or removed and positively held in place by means of an inserted lining barrel. Also to means whereby the valve may be engaged by a removing tool, means for providing a bearing for the valve stem, and various other features of advantage and improvement as shall be more fully hereinafter described.

Referring to the drawings, 2 represents the body or shell of the valve which may be of any usual or preferred design having an inlet opening 3 and outlet opening 4 and an intervening valve controlled passage.

5 is the valve seat having a base flange 6 and an upwardly extending annular rim or seat 7 against which bears the sealing disk 8, constituting the movable closing element. The valve seat 5 rests by its flange 6 upon a corresponding bearing seat 9 formed in the interior of the casing as shown, annularly located around the upper portion of the outlet opening 4, which bearing is properly faced or finished to make a fluid-tight seat. The interior diameter of outlet opening 4, and for the purpose of providing clearance for the insertion of a hook or other removing instrument to dislodge or lift the seat 5, is provided with an annular recess 10 immediately below the bearing face 9. Such clearance may be provided by increasing the diameter of the outlet opening 4 at its upper portion below said seat as shown, or by making one or more individual recesses extending underneath the body of seat 5 for the same purpose.

The interior of casing 2 is provided with a lining 11 which bears at its bottom against the upper outer edge of flange 6, extending throughout the interior to the other end of the case, and which is held immovably in position by the cap 12, bolted to the main case as shown, or secured in any other suitable manner. The lining 11 is conveniently made of a section of brass or copper tubing, having an opening 13 at one end corresponding with the inlet opening 3, and is set within the unfinished cavity of case 2, thereby providing a smooth finished non-corrodible interior throughout from end to end.

For the purpose of positively locating the lining 11 in position so that opening 13 will register with opening 3 I employ one or more lips 14 bent over at the top and adapted to seat in corresponding recesses in the upper portion of the casing as clearly shown, thus preventing turning or movement of the lining shell.

15 is an adjustable valve carrier or holder in which is mounted the valve disk 8 loosely mounted, by means of a transverse supporting pin 16, longitudinal clearance being provided around the pin, said pin being employed merely to prevent detachment of the disk. The disk is set loosely as stated in the under portion of carrier 15 to facilitate proper independent seating upon the seat 7, and is provided with a centrally extended lug 17 fitting within a corresponding socket in the middle portion of the carrier. The abutting face of the lug 17 bears centrally against the inner face of the receiving cavity endwise, and may be rounded as shown to further facilitate automatic seating of the valve under pressure of the stem.

The valve and carrier are adjusted towards or from the seat by means of a turning stem 18 extending through a suitable stuffing box 19 located at the upper extended end of cap 12, and provided with the usual turning handle 20. The lower end of stem 18 is threaded as at 21 and is engaged by the downwardly extending interiorly threaded stem bearing 22, by which construction the stem is amply supported at each end, thus insuring alinement. An especial feature of advantage of such construction is that the threaded bearing is adjacent to the movable valve and when the valve is located in use in other than vertical position, as for instance horizontal, the proper seating of the valve is always insured. Ordinarily, where the threaded end of the stem is remote from the valve proper, the supporting end is necessarily of considerable length and liable to sag or vary from true alinement, especially with valves of larger sizes. The valve carrier is mounted at the end of the valve stem by means of a thimble 23 tapped into the carrier as shown and providing a bearing for a flanged terminal 24 of the stem, the carrier 15 being suitably recessed as at 25 for clearance.

The construction and mode of operation of my invention will be readily understood from the foregoing description. It is simple and cheap in construction, not liable to get out of order, and will perform its functions in a satisfactory and efficient manner.

A particular feature of advantage of my invention is that the valve seat and in fact all of the interior portions of the valve may be readily removed without the necessity of disconnecting the body of the valve from the inlet and outlet connections, and this advantage will be appreciated by all those who are familiar with this class of valves.

Changes and modifications may be made by the skilled mechanic in the design, proportions or arrangement of the device, but all such changes are to be considered as within the scope of the following claims.

What I claim is:

1. In a valve, the combination of a casing provided with an inlet and an outlet opening, an annular seat, a concentric clearance opening immediately below said seat, a removable valve seat having a flat flanged bottom seated upon said annular seat and extending inwardly beyond the wall of said clearance opening and upwardly thereabove to provide a valve-bearing terminal, and an internal lining shell of thin sheet metal bearing against the flange of the seat and held in position by the cap of the valve casing, substantially as set forth.

2. In a valve, the combination of a casing provided with an inlet and an outlet opening, an annular seat, a concentric clearance opening immediately below said seat, a removable valve seat having a flat flanged bottom seated upon said annular seat and extending inwardly beyond the wall of said clearance opening and upwardly thereabove to provide a valve-bearing terminal, and an internal lining shell of thin sheet metal provided with an aperture corresponding with the inlet opening, bearing by its end against the flange of the seat, and held in position by the cap of the valve casing, substantially as set forth.

3. In a valve, the combination of a casing provided with an inlet and an outlet opening, an annular seat, a concentric clearance opening immediately below said seat, a removable valve seat having a flat flanged bottom seated upon said annular seat and extending inwardly beyond the wall of said clearance opening and upwardly thereabove to provide a valve-bearing terminal, and an internal lining shell of thin sheet metal provided with an aperture corresponding with the inlet opening, bearing by its end against the flange of the seat, and held in position by the cap of the valve casing, and means for preventing rotative movement of the shell, substantially as set forth.

4. In a valve, the combination of a casing provided with an inlet and an outlet opening, an annular seat, a concentric clearance opening immediately below said seat, a removable valve seat having a flat flanged bottom seated upon said annular seat and extending inwardly beyond the wall of said clearance opening and upwardly thereabove to provide a valve-bearing terminal, and an internal lining shell of thin sheet metal provided with an aperture corresponding with the inlet opening, bearing by its end against the flange of the seat, and held in position by the cap of the valve casing, said lining shell having a projecting lug or lip bent over at the top and engaging a corresponding recess in the casing to prevent rotation, substantially as set forth.

5. In a valve, the combination with a casing having an inlet and an outlet opening and a valve seat, and a stem-supporting cap having an outwardly extending stuffing box and an inwardly extending threaded stem bearing; of an adjusting stem mounted therein provided with a terminal flange, a valve carrier embracing said terminal flange and provided with a threaded adjusting thimble engaging the flange and a recessed bottom, and a valve disk loosely secured in the carrier and having a central extension provided with a convex terminal bearing against the recessed bottom for automatic adjustment against the valve seat, substantially as set forth.

6. In a valve, the combination of a casing having an inlet and an outlet opening, said outlet opening being circumferentially enlarged and terminating with a flat annularly arranged bearing face, a removable valve seat having a flat flanged bottom seated on said face and extending inwardly beyond the enlargement of the outlet opening and having an upwardly extending valve-bearing terminal, a stem-supporting cap secured on the casing having an outwardly extending stuffing box and an inwardly extending threaded stem bearing, an internal lining shell of thin metal forming the inner wall of the casing apertured with the inlet opening and bearing at one end against the flanged bottom of the valve seat and secured in position at the other end by the cap, a threaded adjusting stem mounted in said stuffing box and threaded bearing provided with a terminal flange, a loosely mounted valve carrier having an adjusting device engaging said flange, and a valve disk loosely mounted in the valve carrier for automatic adjustment against the valve seat, substantially as set forth.

7. In a valve, the combination of a casing having an inlet and outlet opening, said outlet opening being circumferentially enlarged and terminating with a flat annularly arranged bearing face, a removable valve seat having a flat flanged bottom seated on said face and extending inwardly beyond the enlargement of the outlet opening and having an upwardly extending valve-bearing terminal, a stem-supporting cap secured on the casing having an outwardly extending stuffing box and an inwardly extending threaded stem bearing, an internal lining shell of thin metal forming the inner wall of the casing apertured with the inlet opening and bearing at one end against the flanged bottom of the valve seat and secured in position at the other end by the cap, a threaded adjusting stem mounted in said stuffing box and threaded bearing provided with a terminal flange, a loosely mounted valve carrier having an adjusting device engaging said flange and provided with a recessed bottom, and a valve disk loosely mounted in the carrier and having a central extension provided with a convex terminal bearing against the recessed bottom for automatic adjustment against the valve seat, substantially as set forth.

In testimony whereof I affix my signature in presence of two witnesses.

JOHN F. ROBERTSON.

In presence of—
 CHAS. S. LEPLEY,
 C. M. CLARKE.